United States Patent
Kim et al.

(10) Patent No.: US 9,497,678 B2
(45) Date of Patent: Nov. 15, 2016

(54) METHOD AND DEVICE FOR HANDOVER OF PACKET SWITCHED SERVICE IN WIRELESS COMMUNICATION SYSTEM

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 14/381,161

(22) PCT Filed: Apr. 3, 2013

(86) PCT No.: PCT/KR2013/002776
§ 371 (c)(1),
(2) Date: Aug. 26, 2014

(87) PCT Pub. No.: WO2013/151334
PCT Pub. Date: Oct. 10, 2013

(65) Prior Publication Data
US 2015/0023277 A1    Jan. 22, 2015

Related U.S. Application Data (60) Provisional application No. 61/619,912, filed on Apr. 3, 2012, provisional application No. 61/620,970, filed on Apr. 5, 2012, provisional application No. 61/766,094, filed on Feb. 18, 2013, provisional
(Continued)

(51) Int. Cl.
*H04W 36/14* (2009.01)
*H04W 36/00* (2009.01)
(Continued)

(52) U.S. Cl.
CPC ......... *H04W 36/14* (2013.01); *H04W 36/0022* (2013.01); *H04W 72/0406* (2013.01); *H04W 72/0453* (2013.01); *H04W 88/02* (2013.01)

(58) Field of Classification Search
CPC .............................. H04W 36/04; H04W 36/14
USPC ......................................... 370/328, 329, 331
See application file for complete search history.

(56) References Cited

U.S. PATENT DOCUMENTS 6,507,567 B1 * 1/2003 Willars ................. H04W 76/04
370/321
8,340,023 B2 * 12/2012 Watfa ................ H04W 36/0022
370/328
(Continued)

FOREIGN PATENT DOCUMENTS

CA          2811727         3/2013
KR    10-2007-0039376       4/2007

OTHER PUBLICATIONS

PCT International Application No. PCT/KR2013/002776, Written Opinion of the International Searching Authority dated Jul. 30, 2013, 20 pages.
(Continued)

*Primary Examiner* — Andrew Lai
*Assistant Examiner* — Andrew C Lee
(74) *Attorney, Agent, or Firm* — Lee, Hong, Degerman, Kang & Walmey (57) ABSTRACT

The present invention relates to a wireless communication system and, more specifically, to a method and device for handover of a packet switched (PS) service. A method for supporting handover of a PS service in a network according to one embodiment of the present invention comprises steps of: acquiring information for identifying a PS service handed over from a first access network to a second access network; and transmitting, to a user equipment, information for directing handover to the second access network for the identified PS service, wherein the information for the identified PS service can be maintained in a network node of the network until handover to the second access network has been completed.

10 Claims, 6 Drawing Sheets

Related U.S. Application Data application No. 61/765,810, filed on Feb. 18, 2013, provisional application No. 61/767,729, filed on Feb. 21, 2013, provisional application No. 61/769,723, filed on Feb. 26, 2013, provisional application No. 61/770,261, filed on Feb. 27, 2013.

(51) Int. Cl.
 *H04W 88/02* (2009.01)
 *H04W 72/04* (2009.01)

(56) References Cited

U.S. PATENT DOCUMENTS

| | | | |
|---|---|---|---|
| 8,493,934 B2* | 7/2013 | Yu | H04W 68/02 370/331 |
| 8,504,043 B2* | 8/2013 | Wu | H04W 36/0022 370/331 |
| 8,705,445 B2* | 4/2014 | Watfa | H04W 36/0033 370/328 |
| 8,811,936 B2* | 8/2014 | Wu | H04W 36/0022 370/329 |
| 9,001,784 B2* | 4/2015 | Ramachandran | H04W 36/0022 370/331 |
| 9,185,541 B1* | 11/2015 | Hannigan | H04W 4/26 |
| 2002/0045447 A1* | 4/2002 | Rasanen | H04W 36/26 455/436 |
| 2002/0068565 A1* | 6/2002 | Purnadi | H04W 36/0033 455/436 |
| 2003/0114158 A1* | 6/2003 | Soderbacka | H04W 36/0066 455/436 |
| 2007/0264996 A1* | 11/2007 | Vikberg | H04W 36/0066 455/426.1 |
| 2009/0238143 A1* | 9/2009 | Mukherjee | H04W 36/0022 370/331 |
| 2009/0239536 A1* | 9/2009 | Fallgren | H04W 36/30 455/436 |
| 2010/0061337 A1* | 3/2010 | Hallenstal | H04W 48/20 370/331 |
| 2010/0098023 A1* | 4/2010 | Aghili | H04W 36/0022 370/331 |
| 2010/0172301 A1* | 7/2010 | Watfa | H04W 36/0022 370/328 |
| 2010/0202413 A1* | 8/2010 | Vikberg | H04W 36/0022 370/332 |
| 2010/0246530 A1* | 9/2010 | Pehrsson | H04W 36/0022 370/331 |
| 2010/0265914 A1* | 10/2010 | Song | H04W 48/18 370/331 |
| 2010/0278142 A1* | 11/2010 | Dwyer | H04W 36/0083 370/331 |
| 2010/0285797 A1* | 11/2010 | Ghai | H04W 36/385 455/426.1 |
| 2010/0290429 A1* | 11/2010 | Wu | H04W 36/0022 370/331 |
| 2010/0290433 A1 | 11/2010 | Stojanovski et al. | |
| 2010/0329243 A1* | 12/2010 | Buckley | H04W 48/18 370/352 |
| 2011/0021216 A1* | 1/2011 | Pudney | H04W 4/12 455/466 |
| 2011/0069817 A1* | 3/2011 | Behle | A61B 6/4283 378/177 |
| 2011/0103277 A1* | 5/2011 | Watfa | H04W 36/0033 370/310 |
| 2011/0110302 A1* | 5/2011 | Faurie | H04W 36/0022 370/328 |
| 2011/0149908 A1* | 6/2011 | Olsson | H04W 36/0022 370/331 |
| 2011/0158121 A1 | 6/2011 | Casati et al. | |
| 2011/0170517 A1* | 7/2011 | Bakker | H04W 36/0033 370/331 |
| 2011/0176485 A1* | 7/2011 | Pudney | H04W 36/0022 370/328 |
| 2011/0176510 A1* | 7/2011 | Hallenstal | H04W 36/0022 370/331 |
| 2011/0216645 A1* | 9/2011 | Song | H04W 36/0022 370/216 |
| 2011/0305180 A1* | 12/2011 | Osterling | H04W 52/0206 370/311 |
| 2011/0310844 A1* | 12/2011 | Rexhepi | H04W 36/005 370/331 |
| 2012/0015650 A1* | 1/2012 | Pudney | H04W 8/08 455/434 |
| 2012/0044868 A1* | 2/2012 | Faccin | H04W 60/00 370/328 |
| 2012/0069731 A1* | 3/2012 | Tooher | H04W 76/026 370/221 |
| 2012/0087340 A1* | 4/2012 | Yang | H04W 36/0022 370/331 |
| 2012/0182912 A1* | 7/2012 | Watfa | H04W 36/0022 370/311 |
| 2013/0107859 A1* | 5/2013 | Shi | H04W 36/18 370/331 |

OTHER PUBLICATIONS

Apostolis, et al., "Voice Call Handover Mechanisms in Next-Generation 3GPP Systems," IEEE—3GPP Release 8, Feb. 2009, 11 pages.

Wu, et al., "Providing Voice Service Continuity in Evolved Packet Systems," IEEE Wireless Communications, Oct. 2010, 9 pages.

European Patent Office Application Serial No. 13772136.1 Search Report dated Jan. 5, 2016, 10 pages.

3rd Generation Partnership Project (3GPP), "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0, Mar. 2012, 284 pages.

3rd Generation Partnership Project (3GPP), "Technical Specification Group Services and System Aspects; Circuit Switched (CS) fallback in Evolved Packet System (EPS); Stage 2 (Release 11)," 3GPP TS 23.272 V11.0.0, Mar. 2012, 87 pages.

* cited by examiner

METHOD AND DEVICE FOR HANDOVER OF PACKET SWITCHED SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2013/002776, filed on Apr. 3, 2013, which claims the benefit of U.S. Provisional Application Ser. No. 61/619,912, filed on Apr. 3, 2012, 61/620,970, filed on Apr. 5, 2012, 61/766,094, filed on Feb. 18, 2013, 61/765,810, filed on Feb. 18, 2013, 61/767,729, filed on Feb. 21, 2013, 61/769,723, filed on Feb. 26, 2013, and 61/770,261, filed on Feb. 27, 2013, the contents of which are all hereby incorporated by reference herein in their entirety.

TECHNICAL FIELD

The present invention relates to a wireless communication system and, more particularly, to a method and device for handover of a packet switched service.

BACKGROUND ART

When a user equipment operating in an access network supporting both circuit switched (CS) services and packet switched (PS) services or supporting only PS services moves to another access network due to change in radio access technology (RAT) or circuit switched fallback (CSFB), the PS services (e.g., bearers) are processed in a manner that the services are suspended, some of the services are dropped, or Quality of Service (QoS) is lowered.

If there is another network to which handover of a PS service can be performed without deteriorating the user experience of the PS service, handover of the PS service is preferably performed in the situation as above. However, the operation of handover of a PS service to other access networks in the above situation is not defined in the conventional wireless communication systems.

DISCLOSURE

Technical Problem

An object of the present invention devised to solve the problem lies in a new method for handover of PS services.

It is to be understood that technical objects to be achieved by the present invention are not limited to the aforementioned object and other technical objects which are not mentioned herein will be apparent from the following description to one of ordinary skill in the art to which the present invention pertains.

Technical Solution

The object of the present invention can be achieved by providing a method for supporting handover of a packet switched (PS) service in a network, including acquiring information for distinguishing a PS service subjected to handover from a first access network to a second access network, and transmitting, to a user equipment (UE), information for commanding handover of the distinguished PS service to the second access network, wherein information about the distinguished PS service is maintained in a network node of the network until handover to the second access network is completed.

In another aspect of the present invention, provided herein is a method for a network node device for supporting handover of a packet switched (PS) service, including a transceiver module, and a processor, wherein the processor is configured to acquire information for distinguishing a PS service subjected to handover from a first access network to a second access network, and transmit, to a user equipment, information for commanding handover of the distinguished PS service to the second access network using the transceiver module, wherein information about the distinguished PS service is maintained in the network node device until handover to the second access network is completed.

The following details can be commonly applied to the above aspects of the present invention.

Information for triggering handover to the second access network node may be received from the UE.

The information for distinguishing the PS service subjected to handover to the second access network may be stored in at least one network node belonging to the network.

Information indicating that the handover of the distinguished PS service to the second access network node has been initiated or is about to be initiated may be received from the UE.

Updating of information about the distinguished PS service may be deferred until handover to the second access network is completed.

The updating of information about the distinguished PS service may include at least one of release, activation, deactivation, addition, deletion, and modification of the information about the distinguished PS service and a network resource.

The method according to claim 1, wherein context information about the distinguished PS service is maintained in the network node until handover to the second access network is completed.

Data for the distinguished PS service is buffered in the network node until handover to the second access network is completed.

The information for the distinguishing may be information for distinguishing the PS service subjected to handover to the second access network from a PS service moved from the first access network to a different radio access technology (RAT) or a different access network other than the second access network.

When the PS service subjected to handover to the second access network is moved to the different RAT or the different access network, the PS service is one of a PS service having a degraded quality of service (QoS), a dropped PS service, and a PS service suspended in the first access network.

The handover of the PS service to the second access network may be performed in parallel while inter-RAT PS handover or circuit switched fallback (CSFB) is performed in the first access network.

After the information for commanding handover to the second access network is provided to the UE, handover to the second access network may be initiated by the UE.

The network node may include at least one of a mobility management entity (MME), a serving GPRS (General Packet Radio Service) supporting node (SGSN), a packet data network-gateway (P-GW), a serving gateway (S-GW), and a home-subscriber server (HSS).

The first access network may be an evolved-UMTS (Universal Mobile Telecommunications System) terrestrial radio access network (E-UTRAN), and the second access network is a wireless local access network (WLAN).

The different RAT or the different access network may be the UTRAN or a GSM (Global System for Mobile Communication)/EDGE (Enhanced Data rates for Global Evolution) radio access network (GERAN). In the first access network, a source radio access technology (RAT) to start the CSFB may be an evolved-UMTS (Universal Mobile Telecommunications System) terrestrial radio access network (E-UTRAN), and a target RAT may be a GSM (Global System for Mobile Communication)/EDGE (Enhanced Data rates for Global Evolution) radio access network (GERAN) or a UTRAN, the target RAT being a RAT being changed due to the CSFB.

The CSFB may be CSFB to a GERAN or to a UTRAN, the GERAN not supporting a dual transfer mode (DTM) and the UTRAN not supporting the PS handover.

The above general description and following description of the present invention are exemplarily given to supplement the recitations in the claims.

Advantageous Effects

According to one embodiment of the present invention, a new method and device for handover of a PS service may be provided.

It will be appreciated by persons skilled in the art that that the effects that can be achieved from the present invention are not limited to those described above and other effects of the present invention will be more clearly understood from the following detailed description.

DESCRIPTION OF DRAWINGS

The accompanying drawings, which are included to provide a further understanding of the invention, illustrate various embodiments of the invention and together with the description serve to explain the principle of the invention.

BEST MODE

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

It should be noted that specific terms disclosed in the present invention are intended to provide understanding of the present invention and these specific terms may be changed to other forms within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The technology described below may be used in various wireless communications systems. For clarity, the following description focuses on 3GPP LTE and 3GPP LTE-A systems. However, the spirit of the present invention is not limited thereto.

Terms used in the present specification are defined below.

UMTS (Universal Mobile Telecommunications System): A global system for mobile communication (GSM)-based third generation mobile communication technology developed by 3GPP.

EPS (Evolved Packet System): A network system including an evolved packet core (EPC), which is a packet switched (PS) core network based on Internet protocol (IP), and an access network such as LTE and UTRAN. EPS is an evolved form of UMTS.

NodeB: A base station of GERAN/UTRAN. The NodeB is installed outdoors and provides coverage of a macro cell scale.

eNodeB: A base station of LTE. The eNodeB is installed outdoors and provides coverage of a macro cell scale.

HNB (Home NodeB): Customer premises equipment (CPE) providing UMTS terrestrial radio access network (UTRAN) coverage. For more details refer to standard document TS 25.467.

HeNB (Home eNodeB): Customer premises equipment (CPE) providing evolved-UTRAN (E-UTRAN) coverage. For more details refer to standard document TS 36.300.

UE (User Equipment): A user device. The UE may be referred to as a terminal, amobile equipment (ME), a mobile station (MS), etc. In addition, the UE may be a portable device such as a laptop, a cell phone, a personal digital assistant (PDA), a smartphone and a multimedia device or a non-portable device such as a vehicle mounted device. The UE is capable of performing communication through a 3GPP spectrum such as LTE and/or a non-3GPP spectrum such as WiFi and a spectrum for public safety.

RAN (Radio Access Network): A unit including a NodeB, an eNodeB and a radio network controller (RNC) for controlling the NodeB and the eNodeB in a 3GPP network. RAN is present between a UE and a core network and provides connection to the core network.

MME (Mobility Management Entity): A network node of an EPS network which performs functions of mobility management (MM) and session management (SM).

HLR (Home Location Register)/HSS (Home Subscriber Server): Database having subscriber information in a 3GPP network. The HSS may perform functions such as configuration storage, identity management and user state storage.

PDN-GW (Packet Data Network-Gateway)/PGW: A network node of an EPS network that performs functions of UE IP address allocation, packet screening and filtering, charging data collection, etc.

SGW (Serving Gateway): A network node of an EPS network that performs mobility anchor, packet routing, idle mode packet buffering, and a function of triggering an MME to page a UE.

PCRF (Policy and Charging Rule Function): An EPS network node that performs policy decision for dynamically applying the quality of service (QoS) and charging policy which are differentiated as per service flows.

NAS (Non-Access Stratum): An upper stratum of a control plane between a UE and an MME. This is a functional layer for signaling between a UE and a core network and exchanging a traffic message in an LTE/UMTS protocol stack, and the main functions thereof are supporting UE mobility and supporting a session management procedure for establishing and maintaining IP connection between a UE and a PDN GW.

PDN (Packet Data Network): A network in which a server (e.g., a multimedia messaging service (MMS) server, a wireless application protocol (WAP) server, etc.) that supports a specific service is located.

PDN connection: Logical connection between a UE and a PDN, which is expressed by one IP address (one IPv4 address and/or one IPv6 prefix).

APN (Access Point Name): A string indicating or identifying a PDN. A requested service or a network (PDN) is accessed through a PGW and the APN is a name (string) pre-defined in the network in order to find the PGW. For example, the APN may be expressed as internet.mnc012.mcc345.gprs.

AS (Access-Stratum): A layer including a protocol stack between a UE and a radio network or between a UE and an access network and serving to transmit data and a network control signal.

PLMN (Public Land Mobile Network): A network configured for the purpose of providing mobile communication services to individuals. This network may be distinguishably configured as per operators.

CSFB (Circuit Switched FallBack): Fallback of a UE having an E-UTRAN access to a UTRAN/GERAN CS domain access. Various CS domain services such as a voice service may be provided by the CSFB (see standard document 3GPP TS 23.272).

MAPCON (Multi-Access PDN Connectivity): Technology supporting establishment of a plurality of PDN connections over different access networks.

IFOM (IP Flow Mobility): Technology for seamlessly or selectively moving radio access on the basis of IP flow unit.

NSWO (Non-Seamless WLAN Offload): Technology for transmitting an IP flow over a WLAN access network through the Internet. This technology does not guarantee mobility without seamless movement of the IP flow.

LIPA (Local IP Access): Technology enabling an IP capable UE to access an IP capable entity in the same IP network via an H(e)NB.

SIPTO (Selected IP Traffic Offload): Technology for diverting a user's traffic through selection of a packet data network gateway (PGW) present physically close to a UE in an EPC network by an operator.

ANDSF (Access Network Discovery and Selection Function): An entity that provides a rule and a policy which are needed for a UE to find and access a non-3GPP access network (e.g., WLAN (or WiFi), Wimax, etc.) usable for data communication in addition to a 3GPP access network (e.g., Long Term Evolution (LTE), LTE-A (Advanced), etc.). The ANDSF may provide inter-system mobility policy (ISMP), inter-system routing policy (ISRP), or discovery information to a UE as per an operator's configuration.

Evolved Packet Core (EPC)

Figure 1:
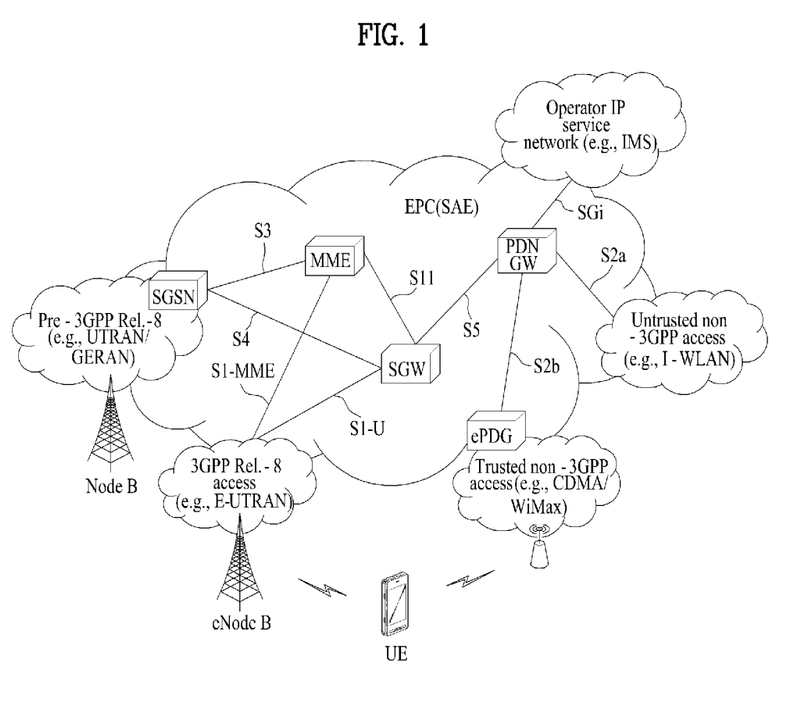
FIG. 1 is a diagram schematically illustrating an architecture of an evolved packet system (EPS) including an evolved packet core (EPC).

FIG. 1 is a diagram schematically illustrating the architecture of an evolved packet core (EPC).

The EPC is a fundamental element of system architecture evolution (SAE) for improving performance of 3GPP. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support packet-based real-time and non-real-time services. In the existing mobile communication system (i.e., a second or third generation mobile communication system), a core network function has been implemented through two distinct sub-domains of a circuit-switched (CS) sub-domain for voice and a packet-switched (PS) sub-domain for data. In a 3GPP LTE system which is evolved from the third generation communication system, however, sub-domains of CS and PS have been unified into one IP domain. That is, in a 3GPP LTE system, connection between UEs having IP capabilities may be configured through an IP-based base station (e.g., an eNodeB (evolved Node B)), an EPC, and an application domain (e.g., an IMS). That is, the EPC is an essential structure for implementation of an end-to-end IP service.

The EPC may include various constituents. FIG. 1 shows a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and is an element which performs a function of maintaining a data path between an eNodeB and a PDG GW. In addition, if a UE moves over a region served by an eNodeB, the SGW serves as a local mobility anchor point. That is, packets may be routed through the SGW for mobility in an evolved universal terrestrial radio access network (E-UTRAN) defined after 3GPP Release-8. In addition, the SGW may serve as an anchor point for mobility of another 3GPP network (an RAN defined before 3GPP Release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. The PDN GW may also serve as an anchor point for mobility management with a 3GPP network and a non-3GPP network (e.g., an untrusted network such as an interworking wireless local area network (I-WLAN) and a trusted network such as a code division multiple access (CDMA) or WiMAX network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and performs signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for an untrusted non-3GPP network (e.g., an I-WLAN, a Wi-Fi hotspot, etc.).

As described with reference to FIG. 1, a UE having IP capabilities may access an IP service network (e.g., an IMS) provided by an operator via various elements in the EPC based on 3GPP access or non-3GPP access.

FIG. 1 also shows various reference points (e.g., S1-U, S1-MME, etc.). In the 3 GPP system, a conceptual link connecting two functions present in different functional entities of an E-UTRAN and an EPC is defined as a reference point. Table 1 given below shows the reference points shown in FIG. 1. In addition to the exemplary reference points of Table 1, various reference points may be present according to network structures.

TABLE 1

| Reference point | Description |
| --- | --- |
| S1-MME | Reference point for the control plane protocol between E-UTRAN and MME |
| S1-U | Reference point between E-UTRAN and SGW for user plane tunneling per bearer and inter-eNodeB path switching during handover |
| S3 | Reference point between MME and SGSN that enables user and bearer information exchange for inter-3GPP access network mobility in idle and/or active state. This reference point can be used in or between PLMNs (e.g. in the case of Inter-PLMN HO) |
| S4 | Reference point between SGW and SGSN which provides relevant control and mobility support between GPRS core and the 3GPP Anchor function of SGW. In addition, if a direct tunnel is not established, it provides user plane tunneling. |
| S5 | Reference point for providing user plane tunneling and tunnel management between SGW and PDN GW. This reference point is used for SGW relocation if the SGW needs to be connected to a non-co-located PDN GW due to UE mobility and for the required PDN connectivity. |
| S11 | Reference point between MME and SGW |
| SGi | Reference point between the PDN GW and the PDN. The PDN may be an operator external public or private packet data network or an intra operator packet data network, e.g. for provision of IMS services. This reference point corresponds to Gi for 3GPP access. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point providing associated control between the ePDG and the PDN GW and mobility support to a user plane.

PS service Handover

The present invention proposes a new method for handover of a PS service between a 3GPP access network and a non-3GPP access network (e.g., WLAN) in a mobile communication system based on 3GPP GSM (Global System for Mobile Communication)/UMTS (Universal Mobile Telecommunication System)/EPS (Evolved Packet System). A conventionally defined wireless communication system (e.g., the EPS) may support non-3GPP access, particularly, connection on WLAN (or WiFi). The EPS standard defines the procedure of acquiring a connection on trusted or untrusted WiFi and the procedure of handover of IP traffic between the 3GPP access network and WiFi. In addition, in the EPS, the ANDSF may provide a mechanism capable of determining which access technology is preferred for specific IP traffic under specific conditions (using, for example, ISRP). This mechanism may be applied to both mobility of traffic connected through the EPC and Non-seamless WiFi Offloading (NSWO).

In the EPS, handover of IP traffic may be performed between Radio Access Technologies (RATs). For example, suppose that IP traffic being served on the E-UTRAN is handed over to the UTRAN or GERAN. In this case, according to a conventionally defined handover scheme, EPS bearers may be dropped or reduced depending on the quality of service (QoS) of the EPS bearers, availability of radio resources of a target RAT, and a network policy. This may affect user experience, leading to loss or disconnection of the service.

When WiFi is available, if movement of specific IP traffic to a target RAT (e.g., GERAN or UTRAN) can be avoided and the IP traffic can be directly moved to WiFi during handover of a PS service in a situation in which WiFi is preferred for the IP traffic, bearer loss may be prevented, and delay and handover back to WiFi after handover to the target RAT may be prevented from generating delay and expenses.

However, according to the mechanism defined in the conventional wireless communication systems, relative priorities are not considered between multiple 3GPP access networks and the WLAN, and accordingly mobility to WiFi is not allowed for traffic undergoing service degradation during PS handover or CSFB from the E-UTRAN to the UTRAN/GERAN. Moreover, as described above, since there is no mechanism to reduce potential loss, quality degradation, and suspension of bearers due to handover between 3GPP RATs and handover to WiFi, negative influence on user experience cannot be prevented.

To address the above problem, the present invention proposes a method for efficiently supporting PS HO between a 3GPP access network and a non-3GPP access network (e.g., WLAN).

The proposed PS HO method may be exemplarily applied to the following scenario. For example, the proposed PS HO method may be applied to scenarios such as intra-RAT PS HO (e.g., a case in which WiFi access is preferred to UTRAN R99, but not preferred to HSPA in handover from HSPA to UTRAN R99 cells), inter-RAT PS HO (e.g., a case in which WiFi access is preferred to UTRAN/GERAN but not preferred to E-UTRAN in HO from E-UTRAN to UTRAN/GERAN), CSFB to GERAN which does not support the dual transfer mode (DTM) (for example, a situation of suspension of a PS service may be addressed when a UE performs handover of the PS service suspended due to CSFB to WiFi), CSFB to UTRAN which does not support PS HO (for example, a network operator may not support PS HO, and the situation of suspension of a PS service may be addressed when a UE performs handover of the PS service suspended due to CSFB to WiFi), or CSFB which supports PS HO (PS service suspension or service reduction may be addressed by performing handover of a PS service which is dropped or has a lowered QoS to WiFi as in the normal PS HO situation). The above scenarios are merely illustrative and the proposed method may be applied to other various scenarios requiring PS HO in a situation in which a UE receiving PS services over a cellular access network can use WiFi (i.e., a case in which the UE has already accessed WiFi or can access WiFi).

Hereinafter, for clarity of description, embodiments will be separately described. However, two or more of the embodiments described below may be combined.

Embodiment 1

Embodiment 1 relates to inter-RAT PS HO.

Figure 2:
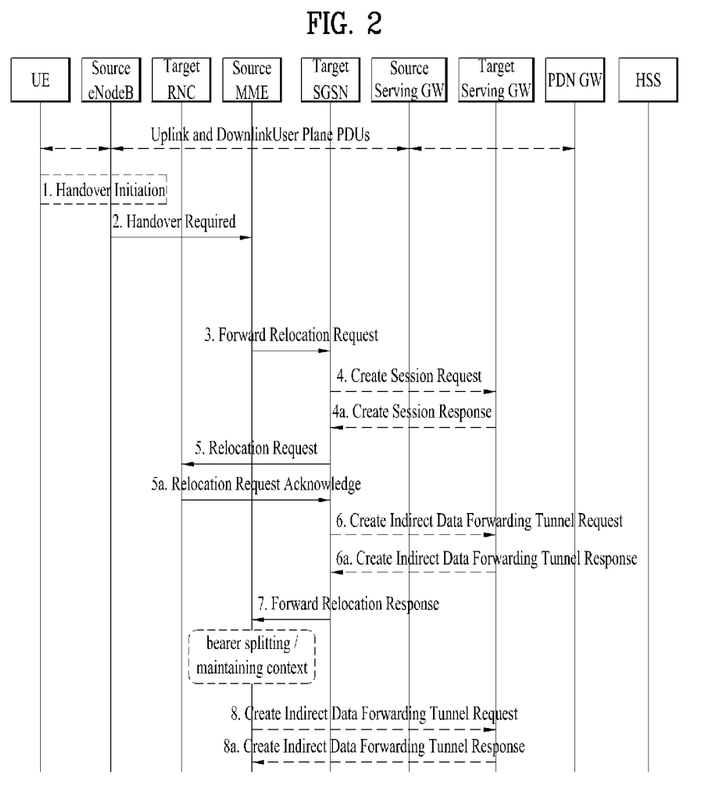
FIG. 2 is a diagram illustrating the preparation step for inter-RAT handover (HO) from an E-UTRAN to a UTRAN according to one embodiment of the present invention.

FIG. 2 is a diagram illustrating the preparation step for inter-RAT HO from E-UTRAN to UTRAN according to one embodiment of the present invention.

Embodiment 1-1

This embodiment relates to an operation of determining whether to perform PS HO from a network to WiFi. Such PS HO to WiFi may triggered by a measurement report from a UE, which does not mean that the UE directly requests PS HO, but may be interpreted as informing the network of radio information necessary for PS HO. That is, according to this embodiment, PS HO may be initiated by determining, in the network (e.g., eNB), whether PS HO is needed based on the report from the UE.

In step 1 of FIG. 2, when the UE transmits a measurement report message to the eNB, the eNB determines that HO is needed, and HO is initiated. In this operation, the UE may send the information requesting PS HO to WiFi on the measurement report message. For example, the information requesting PS HO to WiFi may be explicit information (e.g., information explicitly indicating that a PS service should be handed over to WiFi in the case in which several necessary conditions for traffic affected by PS HO are met) or implicit information (e.g., information indicating that WiFi is preferred to a target RAT, information about preferences or priorities of all RATs available to the UE, information indicating that WiFi is available, etc.).

In step 2 of FIG. 2, the eNB may transmit a message indicating that handover to an MME is required. According to the conventional art, the eNB or MME may recognize, through the processes of FIG. 2, a bearer that is influenced by occurrence of handover (in a manner of, for example, quality degradation of a service due to decrease of QoS, disconnection of the service due to loss of a bearer, etc.) among all PS services (e.g., bearer(s) or PDN connection(s)) provided on the E-UTRAN, and accordingly may determine whether to perform PS HO of one or more PS services to WiFi. The one or more PS services may be part or the entirety of the PS services.

For example, whether to conduct HO of a PS service to WiFi may be determined based on a predetermined policy or configuration related to network selection. For example, whether to conduct HO of a PS service to WiFi may be determined based on at least one of a policy/configuration instructing HO of the PS service to WiFi and a policy/configuration indicating that WiFi has higher priority than GERAN/UTRAN for the PS service.

Such determination may be explicitly performed based on the indication information about one or more specific PS services subjected to HO. Alternatively, it may be implicitly determined that HO of one or more specific PS services is needed or that specific PS services may be selected as objects to be subjected to PS HO, based on determination of QoS degradation or drop of the one or more specific PS services.

Embodiment 1-2

This embodiment relates to operations of splitting a bearer and maintaining context by an MME.

After an MME receives a message indicating that handover is required from the eNB in step 2 of FIG. 2, the MME may split a PS service (e.g., a bearer) and maintain a context during the preparation procedure for inter-RAT HO.

In the example of FIG. 2, the MME may receive a forward relocation request message from a target SGSN, check a radio resource situation of a target network, and then determine an influenced bearer in step 7, and therefore, the bearer splitting/context maintaining operations of the MME may be preferably performed after step 7. However, the scope of the present invention is not limited thereto. The bearer splitting/context maintaining operations of the MME may be performed during (or in parallel with) the process of preparation of handover after the MME receives the handover request message from the eNB.

Specifically, the MME may split and process bearers for PS HO. Splitting and processing the bearers means that a bearer subjected to inter-RAT HO according to a conventional operation is logically distinguished from a bearer subjected to HO to WiFi. That is, it may be determined to hand over some of the PS services to WiFi and the others to UTRAN. The MME may have the UE context information include the determination indicating that the PS services will be split and handed over. Alternatively, rather than directly determining handover, influenced bearers may be implicitly identified to indicate that they may be handed over to WiFi.

The preparation procedure for PS HO may be performed as illustrated through steps 3 to 8 of FIG. 2. Herein, a bearer subjected to HO to WiFi during PS HO may be explicitly indicated. Alternatively, it may be implicitly determined that some bearers need to be handed over to WiFi or may be selected as objects subjected to HO to WiFi, based on the determination of QoS degradation or drop of the bearers during PS HO. In this case, information about the bearers determined as objects subjected to PS HO to WiFi may be stored in the network node(s). Thereby, the network node(s) may process the bearers subjected to PS HO to WiFi according to a procedure separate from the conventional inter-RAT PS HO.

For bearers which are not determined as objects subjected to PS HO to WiFi, it may be determined to drop the bearers from HO or perform HO of the bearers with the QoS of the bearers lowered as in the conventional inter-RAT HO operation. Meanwhile, for the bearers determined as objects subjected to PS HO to WiFi, it may be determined to perform PS HO to WiFi rather than performing inter-RAT HO.

If there is no influence on the conventional inter-RAT PS HO, only the bearers determined to be dropped may be determined as objects subjected to HO to WiFi. If there is an influence on the conventional inter-RAT PS HO, bearers for which QoS is determined to be lowered may be processed (or considered) as the dropped bearers such that inter-RAT PS HO is not performed for the bearers. That is, it may be determined that HO to WiFi will be performed by distinguishing the bearers for which QoS is determined to be lowered due to the conventional inter-RAT HO from the bearers which are determined to be dropped, or by considering the bearers for which QoS is determined to be lowered due to the conventional inter-RAT HO as the bearers which are determined to be dropped.

For details of the other steps which are not explicitly illustrated in FIG. 2, standard document TS 23.401 may be referenced.

Embodiment 1-3

This embodiment relates to initiation of HO to WiFi and implementation of parallel HO.

Figure 3:
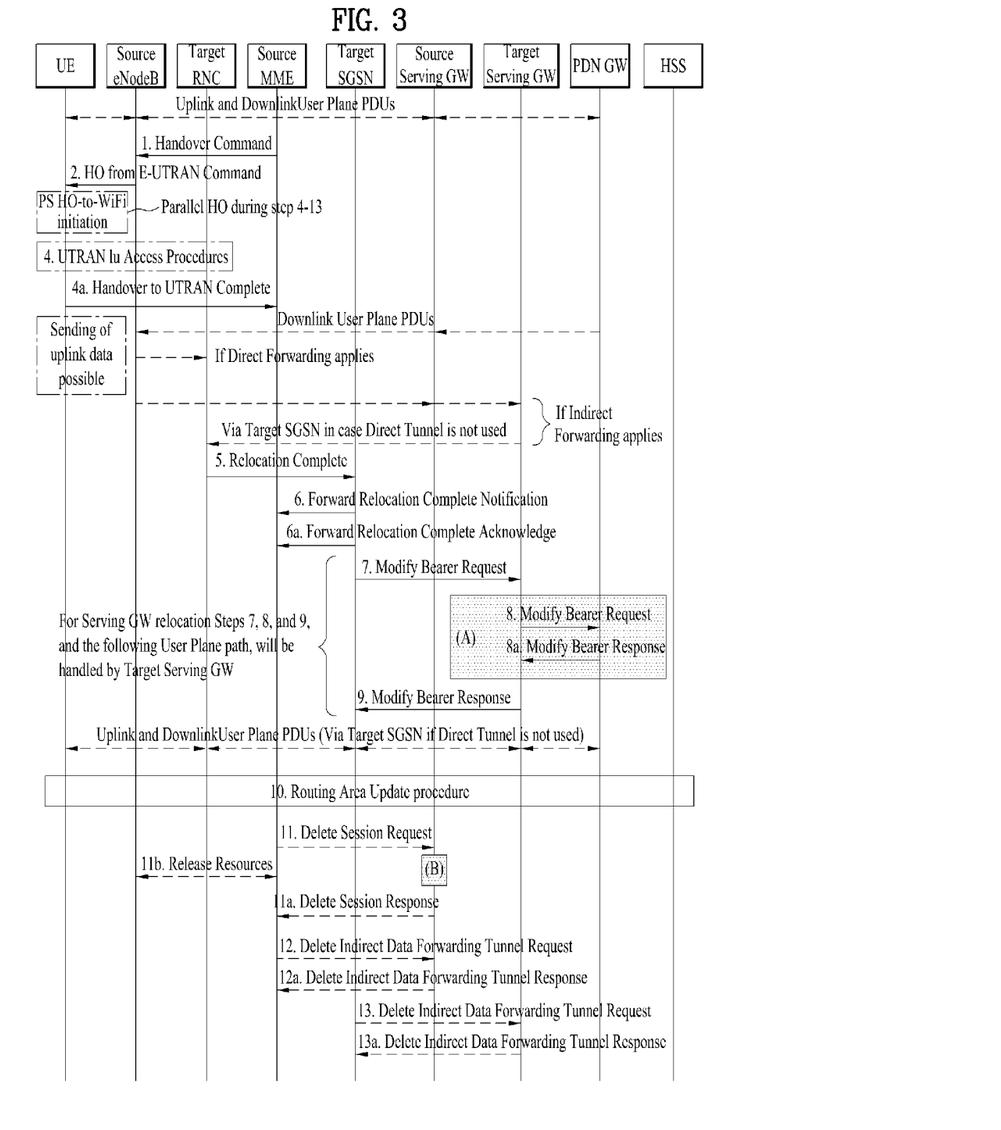
FIG. 3 is a diagram illustrating the execution step for inter-RAT handover (HO) from the E-UTRAN to the UTRAN according to one embodiment of the present invention.

FIG. 3 is a diagram illustrating the execution step for inter-RAT HO from E-UTRAN to UTRAN according to one embodiment of the present invention.

In steps 1 and 2 of FIG. 3, an MME may provide a handover command message to a UE via an eNB. In this case, information about PS service (e.g., a bearer) splitting as described above may be transmitted on the handover command message. The information about the splitting may be information explicitly indicating a bearer subjected to HO to WiFi and a bearer subjected to the inter-RAT HO, or may be information implicitly indicating the bearers through the information indicating a bearer whose QoS will be lowered or a bearer which will be dropped from the inter-RAT HO.

When the UE receives such information about splitting, the UE may initiate a process of HO from a 3GPP access network to a non-3GPP access network. For example, the UE may determine whether access to WiFi is proper by, for example, checking the conditions of the ANDSF.

Thereby, the UE may explicitly or implicitly recognize that a PS to be subjected to HO to WiFi (e.g., a bearer which is determined to have lowered QoS or be dropped in the inter-RAT HO) is present, and may attempt connection to WiFi for the PS service when conditions allowing Ho to WiFi (e.g., whether it is time when access to WiFi is possible, a place where access to WiFi is possible, whether WiFi can be selected according to the priority of a preferred RAT, etc.) are met.

HO to WiFi may be performed after step 2 of FIG. 3, and may be performed in parallel with HO to UTRAN which is performed after step 4. That is, HO to WiFi initiated by the UE and PS HO to UTRAN by a network may be performed simultaneously (or in parallel). In step 4a of FIG. 3, the UE may transmit a Handover to UTRAN Complete message to a target RNC. The UE may include, in the message of step 4a, information indicating that PS HO to WiFi has been initiated or information indicating that PS HO to WiFi will be initiated (or PS HO to WiFi can occur).

That is, in FIG. 3, PS HO-to-WiFi initiation may be performed in parallel with HO to UTRAN of step 4, or may be performed during (or in parallel with) an operation associated with PS HO in the network after step 4 (i.e., in steps 4a to 13).

In view of the UE, PS HO to WiFi may be considered as a procedure of attempting initial access to WiFi rather than as handover. For example, the UE may attempt initial access to WiFi through operations such as an attempt to receive a beacon signal from an access point (AP) to access WiFi. After acquiring access to WiFi, the UE may transmit traffic corresponding to bearers subjected to PS HO to WiFi through WiFi access, using a technology such as the conventional IP traffic mobility.

Embodiment 1-4

This embodiment relates to management of information about split bearers in a P-GW.

When a target SGSN sends a Modify Bearer Request message to the P-GW via an S-GW in step 7 of FIG. 3, the message may carry information indicating that HO is performed by splitting the bearers. This splitting indication information may implicitly instruct that context updating for the bearers be deferred until the P-GW receives a proxy binding update message that is to be received through the process of HO to WiFi, or may include additional information explicitly instructing the deferring operation. Alternatively, the splitting indication information may include information indicating that a bearer to be provided on WiFi needs to be separately managed through a specific marking. That is, information allowing information about the split bearers to be integrally managed in one P-GW may be provided to the P-GW. If a P-GW to manage bearers provided over UTRAN is different from the P-GW to manage bearers provided over WiFi, exchange of associated information between the different P-GWs may be additionally performed.

Herein, integrally managing the information about the bearers means that the bearers are managed in consideration of a correlation between different HO procedures. For example, one HO procedure may be performed only after a specific step of the other HO procedure is performed. Alternatively, the different HO procedures may be independently performed, while the context information marks a specific HO procedure or specific data to distinguish the HO procedures. Such integrated management may prevent a HO procedure for one bearer from incorrectly deleting or updating information associated with another bearer.

Embodiment 1-5

This embodiment relates to a resource release operation.

A Modify Bearer Response that the P-GW sends to the S-GW in step 8a of FIG. 3 or that the S-GW sends to the SGSN in step 9 may include information indicating release of resources only for the bearers subjected to HO to UTRAN in each of the network node(s) of E-UTRAN.

In the Release Resources operation for the eNB performed by the MME in step 11b of FIG. 3, information instructing that only the resources for the bearers subjected to HO to UTRAN be released may be included.

Alternatively, the Modify Bearer Response message sent from the P-GW to the S-GW in step 8a of FIG. 3 may include information instructing that the MME defer release of resources until the two HO procedures (i.e., HO to UTRAN and HO to WiFi) are both performed/completed.

Alternatively, even if there is not information instructing that release of resource be deferred, the MME may perform the Release Resources operation only after the two HO procedures are performed/completed since the MME already recognizes information about bearer splitting.

This is intended to prevent release of resources for a bearer subjected to HO to WiFi even if Ho to UTRAN is completed since HO to WiFi may not be completed when HO to UTRAN is completed, or since the attempt of the UE to perform HO to WiFi may fail.

Thereby, the P-GW may perform at least one of the following operations.

(1) The P-GW may buffer the downlink data of a bearer to be provided over Wifi without dropping any of the data. Thereby, the buffered data may be provided after connection via WiFi is established, and therefore the downlink data may be transmitted to the UE without loss of traffic.

(2) Since the P-GW does not perform context bearer update for the bearers subjected to HO to WiFi, the P-GW neither performs the bearer release procedure, nor performs bearer activation initiated for a lost bearer by the network, nor performs the bearer modification process, which is initiated by the network to modify the QoS of a maintained bearer. Thereby, unnecessary network signaling and use of resources may be prevented.

For details of the other steps, which are not explicitly illustrated in FIG. 3, refer to standard document TS 23.401.

In describing HO to WiFi of a bearer by splitting the bearer in Embodiment 1, it has been assumed that HO to UTRAN is performed. However, embodiments of the present invention are not limited thereto. That is, the proposed principle of the present invention may be applied to the case in which HO to WiFi is performed before HO to UTRAN (although the specific messages/parameters/procedures thereof are not exactly identical to each other) if HO procedures and relevant resource management are performed by splitting the bearers. Similarly, the proposed principle of the present invention may also be applied to operations supporting mobility or HO between various access networks such as IFOM and MAPCON.

Embodiment 2

Embodiment 2 relates to a case in which PS HO is not possible in the situation of CSFB.

At least one PS service (e.g., bearer) provided on E-UTRAN may be handed over to UTRAN/GERAN due to execution of CSFB. In this case, QoS lowering or drop of a bearer may be caused. Additionally, if PS HO is not supported in CSFB (for example, if DTM is not supported in GERAN, or PS HO is not supported in UTRAN), the bearer(s) is suspended in the network. Accordingly, in the case of CSFB, management for QoS degradation, drop or suspension of bearers is required.

Figure 4:
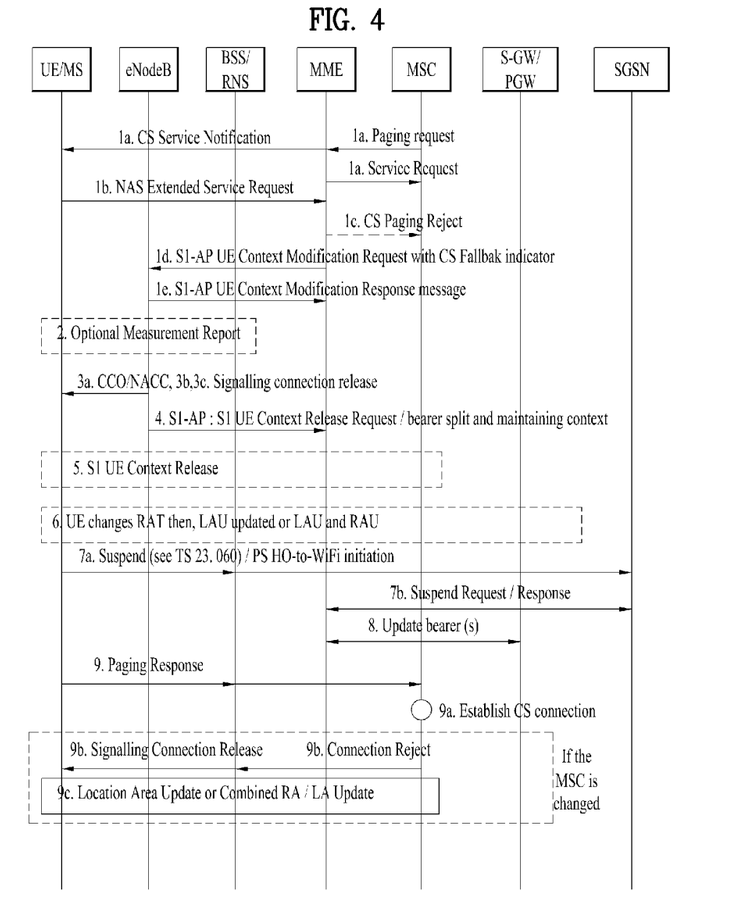
FIG. 4 is a diagram illustrating execution of a call over the GERAN/UTRAN without PS HO when CS paging occurs in an E-UTRAN according to one embodiment of the present invention.

FIG. 4 is a diagram illustrating execution of a call over the GERAN/UTRAN without PS HO when CS paging occurs in an E-UTRAN according to one embodiment of the present invention. The example of FIG. 4 may be understood as relating to a method for handover of a PS service to WiFi during the CSFB procedure for a mobile terminated (MT) call.

Embodiment 2-1

This embodiment relates to a case in which a UE requests a CSFB.

In response to paging in step 1a of FIG. 4, the UE may transmit an extended service request to the MME through a NAS in step 1b of FIG. 4, thereby starting the CSFB procedure. Herein, the UE may include information requesting PS HO to WiFi in the extended service request message. For example, the information requesting PS HO to WiFi may be explicit information (e.g., information instructing HO to WiFi of the PS service) or implicit information (e.g., information indicating that WiFi is preferred to a target RAT of the CSFB, information about preferences or priorities of all RATS available to the UE, information indicating that WiFi is available, etc.).

In this case, an eNB or MME may recognize a bearer that is influenced by occurrence of handover (in a manner of, for example, quality degradation of a service due to decrease of QoS, disconnection of the service due to loss of a bearer, suspension of the service for a certain time according to determination suspension of a bearer, or the like) among all PS services (e.g., bearer(s) or PDN connection(s)) provided on the E-UTRAN, and accordingly may determine whether to perform PS HO of one or more PS services to WiFi. The one or more PS services may be part or the entirety of the PS services.

For example, whether to conduct HO of a PS service to WiFi may be determined based on a predetermined policy or configuration related to network selection. For example, whether to conduct HO of a PS service to WiFi may be determined based on at least one of a policy/configuration instructing HO of the PS service to WiFi and a policy/configuration indicating that WiFi has a higher priority than GERAN/UTRAN for the PS service.

Such determination may be explicitly performed based on the indication information about one or more specific PS services subjected to HO. Alternatively, it may be implicitly determined that HO of one or more specific PS services is needed or that specific PS services may be selected as objects to be subjected to PS HO, based on determination of QoS degradation or drop of the one or more specific PS services.

Embodiment 2-2

This embodiment relates to operations of splitting a bearer and maintaining context by an MME.

In step 4 of FIG. 4, a network node such as the eNB or the MME may store, in network node(s), information indicating that a bearer is an object subjected to PS HO to WiFi, without releasing or suspending the bearer based on explicit indication information during PS HO.

Alternatively, in the case in which the a network node such as the UE, eNB, or MME recognizes, in steps 3 to 6 of FIG. 4, that there is a bearer affected by CSFB (i.e., subjected to, for example, QoS degradation, drop or suspension), the network node determines that PS HO of the bearer to WiFi is needed or that the bearer can be selected as an object to be subjected to PS HO to WiFi. In this case, information indicating that the bearer is an object to be subjected to PS HO to WiFi may be stored in network node(s), without being released or suspended.

Embodiment 2-3

This embodiment relates to CSFB and implementation of parallel HO.

In step 7 of FIG. 4, the UE may perform PS HO to WiFi for a bearer identified as an object to be subjected to HO to WiFi, instead of performing the release operation. That is, PS HO to WiFi may be performed for at least one specific bearer in parallel with the CSFB operation.

In view of the UE, PS HO to WiFi may be considered as a procedure of attempting initial access to WiFi rather than as handover. For example, the UE may attempt initial access to WiFi through operations such as an attempt to receive a beacon signal from an access point (AP) to access WiFi. After acquiring access to WiFi, the UE may transmit traffic corresponding to bearers subjected to PS HO to WiFi through WiFi access, using a technology such as the conventional IP traffic mobility.

Embodiment 2-4

This embodiment relates to management of information about split bearers in a P-GW.

In step 8 of FIG. 4, through the process of bearer context update between network nodes, information indicating that bearers are split (into bearers subjected to PS HO to WiFi and bearers subjected to QoS degradation, drop, or suspension in CSFB) may be provided to the P-GW.

This splitting indication information may implicitly instruct that context updating for the bearers be deferred until the P-GW receives a proxy binding update message that is to be received through the process of HO to WiFi, or may include additional information explicitly instructing the deferring operation. Alternatively, the splitting indication information may include information indicating that a bearer to be provided on WiFi needs to be separately managed through a specific marking. That is, information allowing information about the split bearers to be integrally managed in one P-GW may be provided to the P-GW. If a P-GW to manage bearers subjected to QoS degradation, drop, or suspension in the CSFB is different from the P-GW to manage bearers provided over WiFi, exchange of associated information between the different P-GWs may be additionally performed.

Herein, integrally managing the information about the bearers means that the bearers are managed in consideration of a correlation between the CSFB procedure and the procedure of HO to WiFi. For example, the procedure of HO to WiFi may be performed only after a specific step of the CSFB procedure is performed, or the CSFB procedure may be performed only after a specific step of the procedure of HO to WiFi is performed. Alternatively, the CSFB procedure and the procedure of HO to WiFi may be independently performed, while the context information marks the procedure of HO to WiFi or specific data to distinguish the different procedures. Malfunction such as deleting or updating information associated with one bearer due to a HO procedure/CSFB procedure for another bearer may be prevented by such integrated management.

Thereby, the P-GW may perform at least one of the following operations.

(1) The P-GW may buffer the downlink data of a bearer to be provided over Wifi without dropping any of the data. Thereby, the buffered data may be provided after connection via WiFi is established, and therefore the downlink data may be transmitted to the UE without loss of traffic.

(2) Since the P-GW does not perform context bearer update for the bearers subjected to HO to WiFi, the P-GW neither performs the bearer release procedure, nor performs bearer activation initiated for a lost bearer by the network, nor perfoms the bearer modification process, which is initiated by the network to modify the QoS of a maintained bearer. Thereby, unnecessary network signaling and use of resources may be prevented.

For details of the other steps, which are not explicitly illustrated in FIG. 3, refer to standard document TS 23.272.

Embodiment 3

Embodiment 3 relates to a case in which PS HO is performed in the situation of CSFB.

Figure 5:
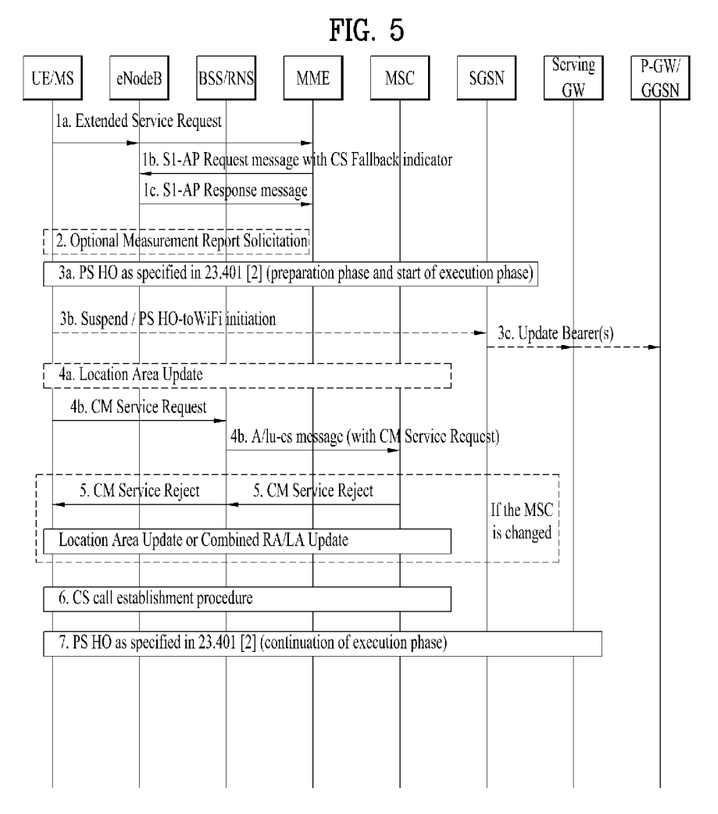
FIG. 5 is a diagram illustrating occurrence of a CS call request in an E-UTRAN and execution of the call in the GERAN/UTRAN according to one embodiment of the present invention.

FIG. 5 is a diagram illustrating occurrence of a CS call request in an E-UTRAN and execution of the call in the GERAN/UTRAN according to one embodiment of the present invention. The example of FIG. 4 may be understood as relating to a method for handover of a PS service to WiFi during the CSFB procedure for a mobile originated (MO) call.

A NAS signaling (e.g., extended service request) message transmitted from a UE to an MME via an eNB in step 1 of FIG. 5 or a measurement report message of step 2 may include information indicating that the UE requests PS HO to WiFi. The other details are the same as those of Embodiment 1-1 or 2-1 and thus description thereof will not be given below.

Upon receiving the information indicating a request for PS HO to WiFi from the UE, the eNB or MME may determine at least one bearer subjected to PS HO to WiFi among the entirety of bearers, and perform an operation such as marking to split the at least one bearer from the other bearers. That is, a network node may perform the bearer splitting and context maintaining operations for PS HO to WiFi. The other details are the same as those of Embodiment 1-2 or 2-2 and thus description thereof will not be given below.

In step 3 of FIG. 5, PS HO may be performed for bearer(s) which are objects to be subjected to PS HO to WiFi. At the same time, a PS HO procedure for other bearer(s) which are not subjected to PS HO to WiFi may also be performed in parallel. The other details are the same as those of Embodiment 1-3 or 2-3 and thus description thereof will not be given below.

Thereby, the P-GW may acquire information about splitting and managing the bearers, and perform at least one of the following operations.

(1) The P-GW may buffer the downlink data of a bearer to be provided over Wifi without dropping any of the data. Thereby, the buffered data may be provided after connection via WiFi is established, and therefore the downlink data may be transmitted to the UE without loss of traffic.

(2) Since the P-GW does not perform context bearer update for the bearers subjected to HO to WiFi, the P-GW neither performs the bearer release procedure, nor performs bearer activation initiated for a lost bearer by the network, nor performs the bearer modification process, which is initiated by the network to modify the QoS of a maintained bearer. Thereby, unnecessary network signaling and use of resources may be prevented.

Alternatively, the PS HO to WiFi request information may not be transmitted from the UE to the MME through NAS signaling in step 1. Instead, the operation in Embodiment 1 described with reference to FIG. 2 may be performed in the PS HO preparation procedure of step 3a, the operation in Embodiment 1 described with reference to FIG. 3 may be performed after step 3b. Details of the operations are the same as those described above in Embodiment 1 and thus description thereof will not be given below.

For details of other steps, which are not explicitly illustrated in FIG. 5, refer to standard document TS 23.272.

In the embodiments of the present invention discussed above, additional information is included in the conventionally defined network signaling message with regard to the operation of PS HO to WiFi of the present invention. However, the scope of the presnt invention is not limited thereto. The proposed information according to the present invention may be included in another message, or a new message including the proposed information may be defined and used.

In addition, in the illustrated embodiments of the present invention, the steps have been described according to the sequential order thereof for simplicity of illustratoin. However, the scope of the present invention is not limited thereto. For example, the sequential order of the steps may be changed, or some steps may be performed in parallel. Moreover, the scope of the present invention also covers the case in which all the steps illustrated in the embodiments may be performed, or only a part of the steps including at least one step may be performed.

In addition, the information defined in the various embodiments of the present invention is not necessarily independent. Nor is it necessarily distinguished from the conventionally defined information. The information including content substantially the same as the content described above may be defined in another format, may be processed together with information for a different purpose, or may be provided as implicit information.

Regarding the method of PS service handover between a 3GPP access network and a non-3GPP access network (e.g., WLAN or WiFi) and change of the access network due to CSFB, the various methods and/or the details of the embodiments of the present invention described above may be independently applied or two or more of the methods and/or embodiments may be combined and simultaneously applied.

Figure 6:
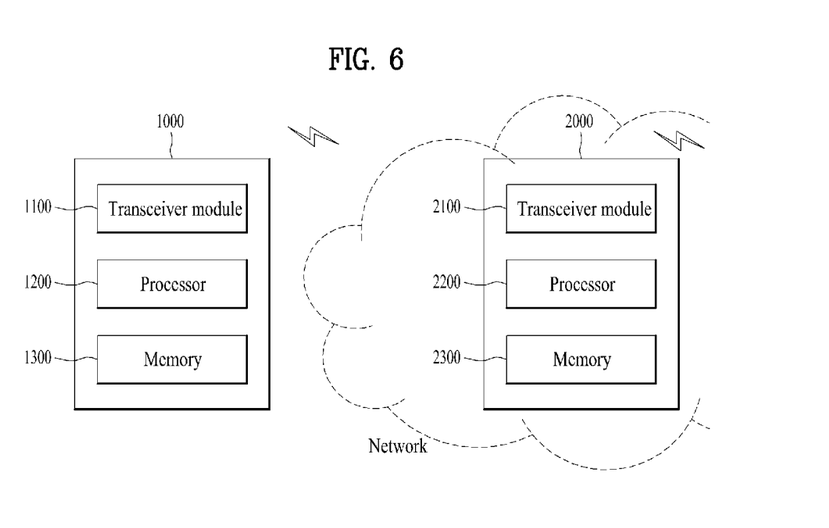
FIG. 6 is a diagram illustrating configuration of a user equipment and a network node device according to a preferred embodiment of the present invention.

FIG. 6 is a diagram illustrating configuration of a UE and a network node device according to a preferred embodiment of the present invention.

Referring to FIG. 6, a UE 1000 may include a transceiver module 1100, a processor 1200, and a memory 1300. The transceiver module 1100 may be configured to transmit and receive various signals, data, and information from/to an external device. The UE 1000 may be connected to an external device by wire and/or wirelessly. The processor 1200 may control overall operations of the UE 1000, and may function to operationally process information to be transmitted and received between the UE 1000 and the external device. Moreover, the processor 1200 may be configured to perform the UE operation proposed in the present invention. The memory 1300, which may be replaced with an element such as a buffer (not shown), may store the processed information for a predetermined time.

Referring to FIG. 6, a network node device 2000 according to the present invention may include a transceiver module 2100, a processor 2200, and a memory 2300. The transceiver module 2100 may be configured to transmit and receive various signals, data, and information from/to an external device. The network node device 2000 may be connected to an external device by wire and/or wirelessly The processor 2200 may control overall operations of the network node device 2000, and may function to operationally process information to be transmitted and received between the network node device 2000 and the external device. Moreover, the processor 2200 may be configured to perform the network node operation proposed in the present invention. The memory 2300, which may be replaced with an element such as a buffer (not shown), may store the processed information for a predetermined time.

The specific configuration of the UE 1000 and the network device 2000 may be implemented such that the various methods and/or the details of the embodiments of the present invention described above are independently applied or two or more of the methods and/or embodiments are combined and simultaneously applied. For clarity, redundant description of the details will be omitted.

The embodiments of the present invention described above may be implemented through various means, for example, hardware, firmware, software, or a combination thereof When implemented by hardware, a method according to embodiments of the present invention may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be implemented in the form of a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

INDUSTRIAL APPLICABILITY

The embodiments of the present invention described above are applicable to various mobile communication systems.

The invention claimed is:

1. A method for supporting handover of a packet switched (PS) service by a Mobility Management Entity (MME), in a network, comprising:
   acquiring, by the MME, information for distinguishing a PS service subjected to handover when a Wireless Local Access Network (WLAN) is available and Internal Protocol (IP) traffic for the PS service is configured to prefer the WLAN;
   performing, by the MME, an operation for splitting bearers for the PS service to distinguish a bearer subjected to inter-radio access technology (inter-RAT) handover from a bearer subjected to handover to the WLAN; and
   transmitting, by the MME to a user equipment (UE), a UE context for the distinguished PS service,
   wherein the UE context for the distinguished PS service indicates the bearer subjected to handover to a WLAN by decreasing a quality of service (QoS) of the bearer subjected to handover to a WLAN, and
   wherein the UE context for the distinguished PS service is maintained in the MME until the handover is completed.

2. The method according to claim 1, wherein information for triggering the PS service subjected to handover to the second access network node is received from the UE.

3. The method according to claim 1, wherein the information for distinguishing the PS service subjected to the handover is stored in at least one network node belonging to the network.

4. The method according to claim 1, wherein information indicating that the handover of the distinguished PS service to the WLAN.

5. The method according to claim 1, wherein data for the distinguished PS service is buffered in the MME until the handover is completed.

6. The method according to claim 1, wherein the handover of the PS service to the WLAN is performed in parallel while inter-RAT PS handover or circuit switched fallback (CSFB) is performed.

7. The method according to claim 6, wherein the CSFB is CSFB to a GERAN or to a UTRAN, the GERAN not supporting a dual transfer mode (DTM) and the UTRAN not supporting the PS handover.

8. The method according to claim 6, wherein, after the context for the distinguished PS service is provided to the UE, the handover to the WLAN is initiated by the UE.

9. The method according to claim 8, wherein a source radio access technology (RAT) to start the CSFB is an evolved-UMTS (Universal Mobile Telecommunications System) terrestrial radio access network (E-UTRAN), and a target RAT is a GSM (Global System for Mobile Communication)/EDGE (Enhanced Data rates for Global Evolution) radio access network (GERAN) or a UTRAN, the target RAT being a RAT being changed due to the CSFB.

10. A Mobility Management Entity (MME) for supporting handover of a packet switched (PS) service, comprising:
    a radio frequency unit; and
    a processor, wherein the processor is configured to:
    acquire information for distinguishing a PS service subjected to handover when a Wireless Local Access Network (WLAN) is available and Internal Protocol (IP) traffic for the PS service is configured to prefer the WLAN,
    perform an operation for splitting bearers for the PS service to distinguish a bearer subjected to inter-radio access technology (inter-RAT) handover from a bearer subjected to handover to a WLAN, Wireless Local Access Network, and
    transmit, to a user equipment, a UE context for the distinguished PS service, wherein the UE context for the distinguished PS service indicates the bearer subjected to handover to a WLAN by decreasing a quality of service (QoS) of the bearer subjected to handover to a WLAN, and
    wherein the UE context for the distinguished PS service is maintained in the MME until the handover is completed.

* * * * *